United States Patent [19]
Uhlemann

[11] Patent Number: 6,091,937
[45] Date of Patent: Jul. 18, 2000

[54] METHOD AND APPARATUS FOR THE AUTOMATIC ADJUSTMENT OF A SWITCH MEANS FOR AUTOMATIC SWITCHING BETWEEN A RECEPTION OPERATING MODE AND A TRANSMISSION OPERATING MODE IN A HANDS-FREE MEANS OF A COMMUNICATION TERMINAL EQUIPMENT

[75] Inventor: Stefan Uhlemann, Munich, Germany

[73] Assignee: Siemens Aktiengesellschaft, Munich, Germany

[21] Appl. No.: 08/858,009

[22] Filed: May 16, 1997

[30] Foreign Application Priority Data

May 17, 1996 [DE] Germany ............... 196 20 031

[51] Int. Cl.⁷ .................................................. H04B 17/00
[52] U.S. Cl. .................. 455/67.1; 455/425; 379/389
[58] Field of Search ...................... 455/423, 425, 455/67.1, 67.4, 568, 569, 570; 379/389, 390; 381/57, 61

[56] References Cited

U.S. PATENT DOCUMENTS 5,007,046  4/1991  Erving et al. .......................... 370/32.1
5,297,198  3/1994  Butani et al. ............................ 379/389

FOREIGN PATENT DOCUMENTS 44 47 028 A1  12/1994  Germany .

*Primary Examiner*—Daniel S. Hunter
*Assistant Examiner*—Darnell R. Armstrong
*Attorney, Agent, or Firm*—Hill & Simpson

[57] ABSTRACT

A method is disclosed for the automatic adjustment of a switch means for automatically switching between a reception operating mode and a transmission operating mode in a hands-free means of a communication terminal equipment comprising a reception signal branch in which received signals are processed and output via a loudspeaker, a transmission signal branch in which signals received via a microphone are processed and output, and comprising the switch means to be adjusted with which attenuation stages provided in the reception signal branch and in the transmission signal branch can be selectively driven dependent on signals transmitted over the reception signal branch and the transmission signal branch and whose sensitivity for the signals transmitted over the transmission signal branch and the reception signal branch is adjustable using an audio signal generator. The disclosed method is characterized in that the switch means is adjusted upon measurement of the extent of the coupling of a test tone signal generated by the audio signal generator from the reception signal branch onto the transmission signal branch and/or from the transmission signal branch onto the reception signal branch.

12 Claims, 1 Drawing Sheet

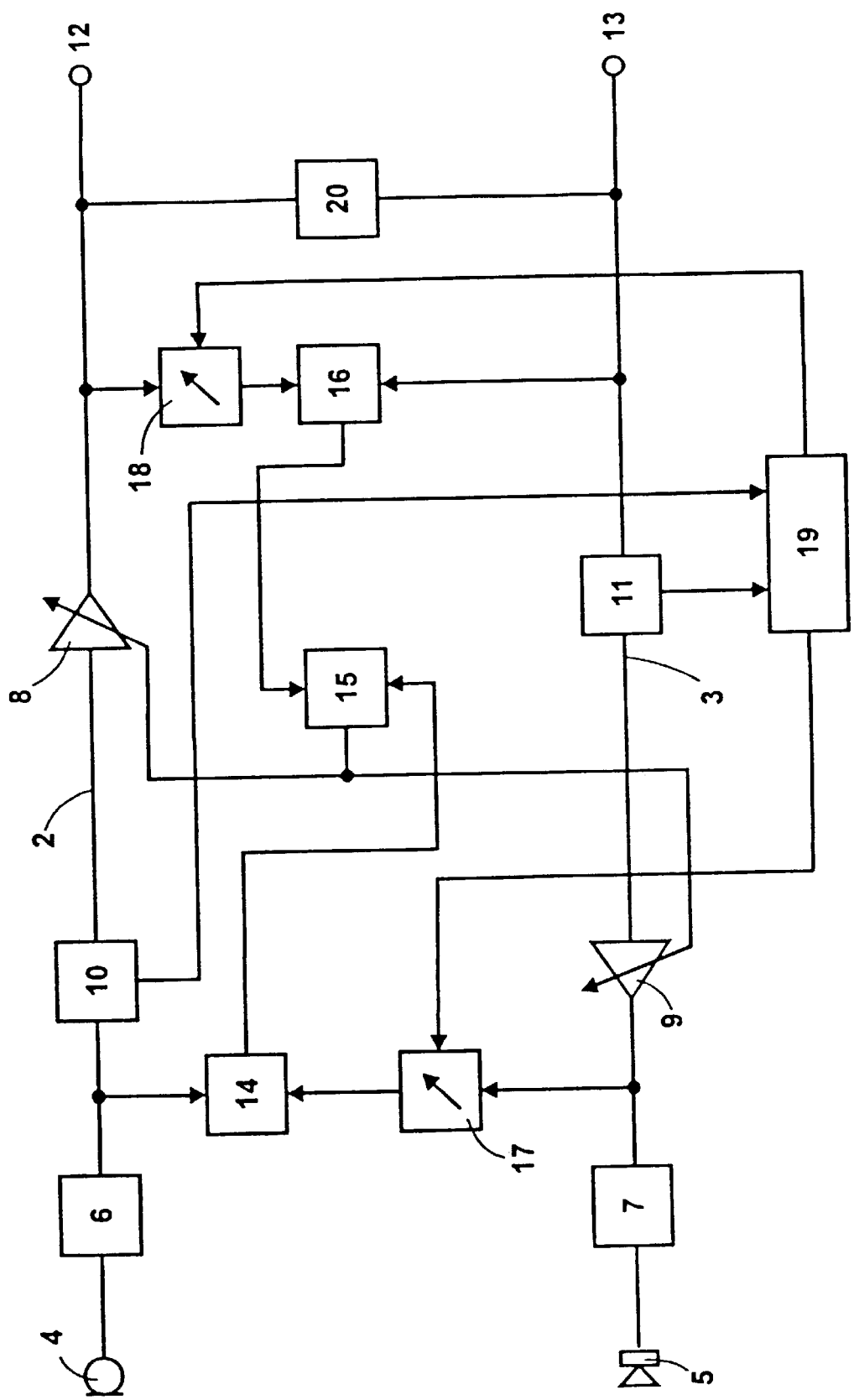

METHOD AND APPARATUS FOR THE AUTOMATIC ADJUSTMENT OF A SWITCH MEANS FOR AUTOMATIC SWITCHING BETWEEN A RECEPTION OPERATING MODE AND A TRANSMISSION OPERATING MODE IN A HANDS-FREE MEANS OF A COMMUNICATION TERMINAL EQUIPMENT

BACKGROUND OF THE INVENTION

The present invention is directed to a method for the automatic adjustment of a switch means for automatically switching between a reception operating mode and a transmission operating mode in a hands-free means of a communication terminal equipment. DE 44 47 028 A1, for example, discloses such a method.

In DE 44 47 028 A1, there is disclosed a reception signal branch in which received signals are processed and output via a loudspeaker, a transmission signal branch in which signals received via a microphone are processed and output, and adjustable switch means by which attenuation stages provided in the reception signal branch and the transmission signal branch can be selectively driven dependent on signals transmitted via the reception signal branch and the transmission signal branch and whose sensitivity for the signals transmitted via the reception signal branch and the transmission signal branch can be set upon employment of an audio signal generator.

The hands-free means to be adjusted with the method described in DE 44 47 028 A1 is a component part of a digital communication terminal equipment such as, for example, a telephone or the like, and comprises a reception signal branch, a transmission branch and a switch means for automatically switching between a reception operating mode and a transmission operating mode.

The reception signal branch serves the purpose of processing input signals received via an input terminal and outputting them via a loudspeaker; the transmission signal branch serves the purpose of processing input signals received via a microphone and outputting them via an output terminal.

In the reception operating mode, signals received from the input terminal are output via the loudspeaker, while the forwarding of signals received via the microphone to the output terminal is entirely or partially suppressed; in the transmission operating mode, signals received via the microphone are forwarded to the output terminal, while the output of received signals from the loudspeaker is entirely or partially suppressed.

The "normal" operation of one of the reception signal branch or the transmission signal branch and the inhibit (attenuation, interruption) of the other branch particularly serves the purpose of avoiding a coupling of signals from the reception signal branch onto the transmission signal branch. Such a coupling of signals from the reception signal branch onto the transmission signal branch is usually caused by signals output by the loudspeaker of the reception signal branch being picked up by the microphone of the transmission signal branch. This effect, of course, is undesirable since the signals to be actually transmitted are thereby provided with an echo or are overlaid by a feedback whine.

For selective activation of either the reception signal branch or of the transmission signal branch and for inhibiting the nonactivated branch, the apparatus disclosed in DE 44 47 028 A1 includes an attenuation unit in its reception signal branch and its transmission signal branch, these being selectively driveable by the switch means.

The switch means drives the attenuation stages according to the signals conducted over the reception signal branch and the transmission signal branch. A voice signal comparator is utilized with which the levels of the respective signals are compared. In order to lend the voice signal comparator different sensitivities for the signals to be compared, it being particularly significant for handling what is referred to as the reception-side self-interruption, an amplifier with variable gain factor precedes one of the inputs of the voice signal comparator. The switch behavior of the switch means can be influenced by setting the gain factor of this amplifier.

The determination of the optimum setting of the gain factor ensues upon employment of an audio signal generator with which an audio signal is supplied into the reception signal branch as a reception signal (pseudo voice signal) during the adjustment process. The gain factor of the amplifier is adjusted for determining the optimum setting thereof until the point is reached at which the switch means initiates a switching from the reception operating mode into the transmission operating mode. Proceeding from this setting, the gain factor is again modified at the end of the process to a certain extent so that the hands-free means is sure to retain its readiness to receive, i.e. that switch events that disturb (interrupt) the intended communication are avoided.

Even when it is automatically implemented, such a setting of the gain factor is relatively time-consuming and, above all, inexact because the gain factor which is recognizable in the described way can be respectively approximately set to the respectively optimum value. A non-optimum selection of the gain factor results in that the switching between the operating modes of the hands-free means does not ensue at the proper times, i.e. too early, too late or not at all, as a result whereof communication via the hands-free means is substantially deteriorated under certain circumstances or even rendered impossible.

SUMMARY OF THE INVENTION

An object of the present invention is to provide an improved method whereby an optimum adjustment of the switch means is enabled.

In an embodiment, the invention provides a method for the automatic adjustment of an adjustable switch used to automatically switch between a reception operating mode and a transmission operating mode in a hands-free communicator of a communication terminal, comprising a reception signal branch in which received signals are processed and output via a loudspeaker; a transmission signal branch in which signals received via a microphone are processed and output, and the adjustable switch, with which attenuation stages provided in the reception signal branch and in the transmission signal branch can be selectively driven according to the signals transmitted over the reception branch and over the transmission signal branch, and whose sensitivity is adjustable upon use of an audio signal generator for generating the signals transmitted over the reception signal branch and over the transmission signal branch, wherein, the extent of the coupling of a test tone signal generated by the audio signal generator from the reception signal branch onto the transmission branch and/or from the transmission signal branch onto the reception signal branch is measured, and the switch is adjusted according to the measurement.

In accordance therewith, the invention provides that the switch means can be adjusted upon measurement of the extent of the coupling of a test tone signal generated by the audio signal generator from the reception signal branch onto the transmission signal branch and/or from the transmission signal branch onto the reception signal branch.

The knowledge of the extent of the coupling of signals of the one branch onto the other branch allows the adjustment of the switching behavior of the switch means to be determined not, for instance, upon repeated or, respectively, continued variation of the variable or, respectively, adjustable parameters themselves, as in the past, but in a computational way. Such a parameter determination and setting is perceptibly substantially more exact than the known, experimental determination of parameters that is partially based on approximations or estimates.

Determination and setting of the parameters of the switch means can also be implemented extremely fast due to the lack of tedious trials for experimentally finding the (presumed) optimum setting, so that there is only an extremely slight probability that the adjustment will be disturbed or, respectively, deteriorated by occasionally occurring ambient noises or the like. Apart from the time that is thereby saved, this contributes substantially thereto that not only an approximate but always an adjustment of the switch means exactly adapted to the given conditions can be implemented even under difficult setting conditions.

The fast determination and setting of the switch means parameters opens up the possibility of undertaking a balancing of a hands-free means (for eliminating component tolerances and the like) in the manufacturing factory. Due to the time required therefor, this previously was not implementable at all or at most given a rationally high outlay.

The fast and simple determination and setting of the switch means parameters—over and above this—also creates a stimulus to also adapt this to acoustic conditions that are only briefly varied (for example, to temporarily varied resonant conditions).

An advantage of the invention is that optimum matching of a hands-free means to the given conditions is enabled in a simple way and in a shortcut.

These and other features of the invention are discussed in greater detail below in the following detailed description of the presently preferred embodiments with reference to the accompanying drawings.

BRIEF DESCRIPTION OF THE DRAWINGS

FIG. 1 schematically illustrates the structure of a hands-free means wherein the inventive method can be utilized.

DETAILED DESCRIPTION OF THE PRESENTLY PREFERRED EMBODIMENTS

The hands-free means shown in FIG. 1 is a component part of a communication terminal equipment such as, for example, a digital telephone or the like. No limitation as to the implementation of the invention is intended by the illustration in FIG. 1.

The hands-free means comprises a transmission signal branch 2, a reception signal branch 3, a switch means for automatically switching between a reception operating mode and a transmission operating mode of the hands-free means, and an adjustment means for the automatic adjustment of the switch means.

The reception signal branch 3 comprises an input terminal in the form of an input post 13, a reception signal automatic amplifier unit 11 with automatic gain control, a reception signal attenuation stage 9, a reception signal processing stage 7 as well as a loudspeaker 5.

The transmission signal branch 2 comprises a microphone 4, a transmission signal processing stage 6, a transmission signal automatic amplifier unit 10 with automatic gain control, a transmission signal attenuation stage 8 as well as an output terminal in the form of an output post 12.

The switch means comprises a first adjustable amplifier 17, a first voice signal comparators 14, a second adjustable amplifier 18, a second voice signal comparator 16 and an attenuation control unit 15.

The adjustment means comprises a setting means 19 and an audio signal generator 20.

The foregoing elements are interconnected as shown in FIG. 1 and as described in the scope of the following description of function and effect.

The hands-free means is connected via the input post 13 and the output post 12 to, for example, a transmission path, a switching station or to some other external circuitry, for example a voice signal compression or voice signal expansion. Audio signals to be made audible with the loudspeaker 5 are received from a counterpart station via the input post 13, and audio signals picked up by the microphone 4 and to be transmitted to the counterpart station are output via the output post 12.

The hands-free means can be selectively switched between a reception operating mode and a transmission operating mode.

In the reception operating mode, the reception signal attenuation stage 9 is transmissive for adjacent signals, which the transmission signal attenuation stage 8 does not allow adjacent signals to pass or only allows them to pass highly attenuated (the boost usually lies between 25 and 40 dB). Signals received via the input post 13, accordingly, are amplified in this case by the automatic reception signal amplifier 11, pass essentially unimpeded through the reception signal attenuation stage 9, are processed in the reception signal processing stage 7, and are ultimately output as an audible audio signal via the loudspeaker 5. On the other hand, signals picked up by the microphone 4 are processed in the transmission signal processing stage 6 and are amplified by the automatic transmission signal amplifier 10 but are then prevented from being propagated to the output post 12 by the inhibiting transmission signal attenuation unit 8. In the reception operating mode of the hands-free means, signals received via the input post 13 are output via the loudspeaker 5, by which signals obtained via the microphone 4 are blocked, i.e. are not output via the output post 12 or are output thereover at mostly highly attenuated.

In the transmission operating mode, by contrast, the transmission signal attenuation unit 8 is transmissive for adjacent signals, by which the reception signal attenuation unit 9 does not allow adjacent signals to pass or allows them to pass at most highly attenuated (the boost lies between 25 and 40 dB as a rule). Signals received via the microphone 4 in this case are thus processed by the transmission signal processing unit 6, are amplified by the automatic transmission signal amplifier 10, pass essentially unimpeded through the transmission signal attenuation unit 8 and are ultimately output via the output post 12. On the other hand, signals received by the input post 13 are amplified by the automatic reception signal amplifier 11 but are then prevented from being propagated to the loudspeaker 5 by the inhibiting reception signal attenuation stage 9. In the transmission operating mode of the hands-free means, thus, signals picked up by the microphone are output via the output post 12, by which signals received via the input post 13 are blocked, i.e. are not output via the loudspeaker 5 or at most highly attenuated.

The automatic amplifiers, i.e. the automatic reception signal amplifier 11 and the automatic transmission signal amplifier 10 have—as already indicated above—an automatic gain control which effects that (within certain limits) an output signal that is constant on air which is generated regardless of the level of the signal input into the respective amplifier.

The processing stages, i.e. the reception signal processing stage 7 and the transmission signal processing stage 6, serve the purposes of, among other things, implementing an analog-to-digital conversion or, respectively, digital-to-analog conversion.

The attenuation stages, i.e. the reception signal attenuation stage 9 and the transmission signal attenuation stage 8, serve—as was already explained above—for the selective setting of the transmission and reception operating modes. The formation of echoes (acoustic echo and line echo) and/or feedback effects can be avoided by the operation of the hands-free means either in the reception operating mode or in the transmission operating mode. The switching of the hands-free means from the reception operating mode into the transmission operating mode and vice versa, the selective initialization of attenuation stages to allow the signals adjacent thereto to pass or, respectively, to block them, ensues with the switch means that was already mentioned above.

The switching between the respective operating modes initiated by the switch means ensues according to a voice signal comparison that is explained in greater detail below. In order to assure that it is thereby only voice signals that are in fact taken into consideration, the switch means contains one or more voice signal detectors that are not shown in FIG. 1. These voice signal detectors determine whether the signals to be respectively compared are voice signals. When it is thereby found that this is not the case, the forwarding of the appertaining signals or of the evaluation results based thereon is suppressed and/or the respective voice signal comparator and/or the attenuation control unit 15 is made aware of this finding so that these can react accordingly thereto.

The switch means—the attenuation control unit 15 thereof to be more precise—comprises a connection to the attenuation stages via which these can be selectively driven. The drive of the attenuation stages for varying their attenuation behavior preferably ensues such that the attenuation does not suddenly rise or fall to the desired final condition or limit value but respectively slightly attenuated (given ramp-like modification).

The attenuation control unit 15 decides about the setting of the attenuation elements taking into consideration input signals that derive from the first voice signal comparator 14 and from the second voice signal comparator 16. The voice signal comparators respectively compare the levels of the (voice) signals transmitted via the transmission signal branch 2 and the reception branch 3 and output the result of the comparison as input signals for the attenuation control unit 15. In order to be able to vary the sensitivity for the signals input into the voice signal comparators for comparison, one of the signals input into a respective voice signal comparator is conducted over a variable amplifier.

The first variable amplifier 17 is allocated to the first voice signal comparator 14. This first variable amplifier amplifies the voice signal taken from the reception signal branch 3 before it is supplied to the first signal comparator 14; the first voice signal comparator 14 thereby becomes more sensitive for the reception signal.

The second voice signal comparator 16 has the second variable amplifier 18 allocated to it. This second variable amplifier amplifies the voice signal taken from the transmission signal branch before it is supplied to the second voice signal comparator 16; the second voice signal comparator 16 thereby becomes more sensitive for the transmission signal.

As can be seen from FIG. 1, the first voice signal comparator 14 and the second voice signal comparator 16 compare reception and transmission signals that are taken from various points of the reception signal branch 3 and the transmission signal branch 2. The respective tap points obviously are not limited to the points shown in the FIG.

The function of the first voice signal comparator 14 and of the first variable amplifier 17 comprises in avoiding a receive-side self-interruption of the hands-free means, a switching from the reception operating mode into the transmission operating mode caused directly by the received signals themselves. This can occur when the reception signals output over the loudspeaker 5 are picked up by the microphone 4 and are ultimately present in such an intensity on the transmission signal branch 2 that exceeds the level of the reception signals of the reception signal branch, this particularly potentially being the case given the presence of a time offset of the signals to be compared. In order to avoid switchings in operating mode caused as a result thereof, the reception signal is amplified by the variable amplifier 17 before comparison with the transmission signal. As a result, the reception signal taken from the reception signal branch 3 can be boosted to a level that is always higher than the level of the transmission signal based on the reception signal.

The same is true for the second voice signal comparator 16 and the second variable amplifier 18. Their function is to avoid a transmission-side self-interruption of the hands-free means, i.e. a switching from the transmission operating mode into the reception operation mode caused directly by the signals sent from the transmission signal branch. This case can occur when the transmission signals output over the output post 12 are transferred into the input post 13 via an external wiring of the hands-free means and are present in such an intensity on the reception signal branch 3 that exceeds the level of the transmission signals on the transmission signal branch, which can particularly be the case given the presence of a time offset of the signals to be compared. In order to avoid switchings in operating mode caused as a result thereof, the transmission signal is amplified by the variable amplifier 18 before the comparison with the reception signal. As a result thereof, the transmission signal taken from the transmission signal branch 2 can be boosted to a level that is always higher than the level of the reception signal deriving from the transmission signal.

The gain factors set at the variable amplifiers 7 and 18 should not be arbitrarily selected but require optimization. They must exhibit a certain minimum value in order to prevent the probability of the self-interruptions of the hands-free means; on the other hand, they also should not be selected too high because this would then increasingly suppress intended switchings as well.

The setting of the gain factor of the variable amplifiers, i.e. the adjustment of the switch means or, respectively, the switch behavior thereof ensues with the adjustment means (the setting means 19 thereof to be more precise).

The previously determined, optimum gain factors for the variable amplifiers 17 and 18 are stored in the setting means 19 and are employed for the setting thereof. The determination of the optimum gain factors thereby ensues as described next.

It is assumed that the attenuation factor of the attenuation stage 9 is known or, respectively, is set to a known value. It is also assumed that the level of the signals output from the automatic amplifiers 10 and 11 kept constant on average during normal operation and the levels of the signals output by the audio signal generator 20 are known.

For optimum setting of the sensitivity of the voice signal comparator 14, three preparatory precautions are to be undertaken: first, the automatic gain control of the automatic reception signal amplifier 11 is shut off, so that this works with a constant gain; alternatively, the automatic reception signal amplifier 11 can also be taken out of the reception signal branch or be bridged. Further, the audio signal generator 20 not connected to the hands-free means in "normal operation" is connected to the input post 13 and is initialized to output a pseudo voice signal in the form of a test tone signal or of a sequence of test tone signals. Finally, the connection between the input post 13 and the external wiring potentially connected thereto is broken so that only the pseudo voice signal of the audio signal generator is present as a reception signal for the reception signal branch. Following the application of the pseudo voice signal—after the decay of the transient events produced as a result thereof to be more precise, the gain factor of the automatic transmission signal amplifier 10 is interrogated by the setting means 19. The automatic transmission signal amplifier 10 is constructed for this purpose such that it outputs or can output the momentary gain factor continuously or on demand as an additional output signal (to the setting means 19 in the present exemplary embodiment).

The extent of coupling of the test tone signal generated by the audio signal generator from the reception signal branch onto the transmission signal branch can be calculated from the gain and/or attenuation factors and signal levels known from the very outset or determined during the course of the adjustment. The knowledge thereof—the possibility, to be more precise, of determining the amount-wise relationship between the levels of the signals to be compared by the voice signal comparator 14 thereby opened up—in turn allows the gain factor to be defined such for the variable amplifier 17 that, first, a reception-side self-interruption but, second, an unsubstantiated dwelling in the reception operating mode are prevented.

Two preparatory precautions are undertaken for the optimum setting of the sensitivity of the voice signal comparator (proceeding from the "normal condition"): first, the audio signal generator 20 not connected to the hands-free means during "normal operation" is connected to the output post 12 and is initialized to output a pseudo voice signal in the form of a test tone signal or a sequence of test tone signals. On the other hand, the transmission signal branch 2 (for example, between the transmission signal attenuation stage 8 and the output post 12) is interrupted and only the pseudo voice signal of the audio signal generator is present as an output signal from the transmission signal branch. Following the application of the pseudo voice signal—after the decay of the transient events thereby produced to be more precise—, the setting means 19 interrogates the gain factor of the automatic reception signal amplifier 11. To this end, the automatic reception signal amplifier 11, like the automatic transmission signal amplifier 10, is fashioned such that it outputs or can output the momentary gain factor permanently or on demand as an additional output signal (to the setting means 19 in the present exemplary embodiment). The extent of the coupling of the test tone signal generated by the audio signal generator from the transmission signal branch onto the reception signal branch can be calculated from the gain and/or attenuation factors and signal levels known from the very outset or determined during the course of the adjustment. Knowledge thereof—the possibility, to be more precise, of determining the size-wise relationship between the levels of the signals to be compared by the voice signal comparator 16—again allows the gain factor for the variable amplifier 18 to be defined such that, first, a transmission-side self-interruption but, second, an unsubstantiated dwelling in the transmission operating mode are prevented.

The measurement or quantitative acquisition of the extent of the coupling of a pseudo voice signal generated by the audio signal generator 20 from the reception signal branch onto the transmission signal branch and/or from the transmission signal branch onto the reception signal branch enables the adjustment of the switching behavior of a hands-free means to the respectively optimum value under the given circumstances that previously was unknown.

The measurement or quantitative acquisition of the extent of the coupling of the pseudo voice signal generated by the audio signal generator 20 from the reception signal branch onto the transmission signal branch and/or from the transmission signal branch onto the reception signal branch ensues in the described exemplary embodiment by way of the evaluation of signal levels and gain and/or attenuation factors of the components traversed by the pseudo voice signal in the reception signal and transmission signal branches that were partially known and partially separately identified. The quantitative determination of the coupling, however, can also be implemented in another way, for example, by measuring the level of the pseudo voice signal proceeding over the reception signal and transmission signal branch at the points of interest.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for the automatic adjustment of an adjustable switch used to automatically switch between a reception operating mode and a transmission operating mode in a hands-free communicator of a communication terminal, having:

a reception signal branch in which received signals are processed and output via a loudspeaker;

a transmission signal branch in which signals received via a microphone are processed and output, and the adjustable switch, with which attenuation stages provided in the reception signal branch and in the transmission signal branch can be selectively driven according to the signals transmitted over the reception branch and over the transmission signal branch, and whose sensitivity is adjustable using an audio signal generator for generating the signals transmitted over the reception signal branch and over the transmission signal branch, and which comprises means for avoiding a reception-side self-interruption and means for avoiding a transmission-side self-interruption, comprising the steps of:

generating a plurality of test tones with the audio signal generator, measuring the extent of the coupling of the test tones generated by the audio signal generator from the reception signal branch onto the transmission branch and/or from the transmission signal branch onto the reception signal branch, and then adjusting the switch according to the measurement.

2. The method according to claim 1, wherein each means for avoiding self-interruption respectively comprises:

a voice signal comparator with which the levels of the signals conducted over the reception signal branch and transmission signal branch are continuously compared, and an adjustable amplifier with which one of the signals to be compared can be respectively amplified before it is input into the voice signal comparator.

3. The method according to claim 2, wherein the signal conducted over the reception signal branch is amplified by the variable amplifier of the means for avoiding the reception-side self-interruption; and the signal conducted over the transmission signal branch is amplified by the variable amplifier of the means for avoiding transmission-side self-interruption.

4. The method according to any one of claims 2 and 3, wherein the measurement of the extent of the coupling of a test tone signal placed onto the reception signal branch onto the transmission signal branch and/or of the coupling of a test tone signal placed onto the transmission signal branch onto the reception signal branch comprises at least partially evaluating the gain and/or attenuation factors of elements of the reception signal branch and of the transmission signal branch through which the test tone signal passes.

5. The method according to claim 4, wherein the gain and/or attenuation factors of the elements traversed by the test tone signal are at least partially set to known, constant values and/or are quantitatively determined before or during the acquisition of the extent of the coupling.

6. The method according to claim 5, wherein at least one amplifier with automatic gain control for achieving an output signal with constant level is provided as part of the reception signal branch and of the transmission signal branch which the test tone signal traverses.

7. A hands-free communicator of a communication terminal, comprising:

an adjustable switch used to automatically switch between a reception operating mode and a transmission operating mode, the switch comprising means for avoiding a reception-side self-interruption and means for avoiding a transmission-side self-interruption;

a reception signal branch in which received signals are processed and output via a loudspeaker;

a transmission signal branch in which signals received via a microphone are processed and output;

an audio signal generator for generating the signals transmitted over the reception signal branch and over the transmission signal branch; and attenuation stages provided in the reception signal branch and in the transmission signal branch which can be selectively driven according to the signals transmitted over the reception branch and over the transmission signal branch, and whose sensitivity is adjustable upon use of the audio signal generator for generating the signals transmitted over the reception signal branch and over the transmission signal branch, wherein, the communicator is configured to generate an audio signal with the audio signal generator, measure the extent of the coupling of the test tone signal generated by the audio signal generator from the reception signal branch onto the transmission branch and/or from the transmission signal branch onto the reception signal branch, and adjust the switch according to the measurement.

8. The communicator of claim 7, wherein each means for avoiding self-interruption respectively comprises:

a voice signal comparator with which the levels of the signals conducted over the reception signal branch and transmission signal branch are continuously compared, and an adjustable amplifier with which one of the signals to be compared can be respectively amplified before it is input into the voice signal comparator.

9. The communicator of claim 8, wherein signals conducted over the reception signal branch are amplified by the variable amplifier of the means for avoiding the reception-side self-interruption; and signals conducted over the transmission signal branch are amplified by the variable amplifier of the means for avoiding transmission-side self-interruption.

10. The communicator of any one of claims 7, 8 and 9, wherein the communicator is configured such that the measurement of the extent of the coupling of a test tone signal placed onto the reception signal branch onto the transmission signal branch and/or of the coupling of a test tone signal placed onto the transmission signal branch onto the reception signal branch comprises at least partially evaluating the gain and/or attenuation factors of elements of the reception signal branch and of the transmission signal branch through which the test tone signal passes.

11. The communicator of claim 10, wherein the communicator is configured such that the gain and/or attenuation factors of the elements traversed by the test tone signal are at least partially set to known, constant values and/or are quantitatively determined before or during the acquisition of the extent of the coupling.

12. The communicator of claim 11, wherein at least one amplifier with automatic gain control for achieving an output signal with constant level is provided as part of the reception signal branch and of the transmission signal branch which the test tone signal traverses.

* * * * *